No. 4,270. REISSUED FEB. 21, 1871

E. G. OTIS, DEC'D.

OTIS BROS. & COMPANY, ASSIGNEES.

HOISTING APPARATUS.

2 SHEETS—SHEET 1.

Witnesses:
Fred Haynes
R. R. Rabeny

Otis Bros & Co
Chas. R. Otis Pres
John A. Hubbard Sec'y

THE NORRIS PETERS CO., PHOTO-LITHO., WASHINGTON, D. C.

No. 4,270. REISSUED FEB. 21, 1871.

E. G. OTIS, DEC'D.

OTIS BROS. & COMPANY, ASSIGNEES.

HOISTING APPARATUS.

2 SHEETS—SHEET 2.

Witnesses:
Fred Haynes
R. E. Rubens

Otis Bros & Co
Chas. E. Otis Ad
John L. Hulbert

THE NORRIS PETERS CO., PHOTO-LITHO., WASHINGTON, D. C.

United States Patent Office.

OTIS BROTHERS & COMPANY, OF YONKERS, NEW YORK, ASSIGNEES OF E. G. OTIS, DECEASED.

Letters Patent No. 124, dated January 15, 1861; reissue No. 4,270, dated February 21, 1871.

DIVISION B.

IMPROVEMENT IN HOISTING APPARATUS.

The Schedule referred to in these Letters Patent and making part of the same.

*To all whom it may concern:*

Be it known that E. G. OTIS, deceased, of Yonkers, in the county of Westchester and State of New York, invented a new and useful Improvement in Hoisting Apparatus, for which he obtained Letters Patent, No. 124, dated January 15, 1861, of which OTIS BROTHERS & COMPANY, a joint stock company incorporated under the laws of the State of New York, are now the owners; and we, CHARLES R. OTIS, president, and JOHN L. HUBBARD, secretary of the said company, do hereby declare that the following is a full, clear, and exact description of the same, reference being had to the accompanying drawing forming part of this specification, in which—

Similar letters of reference indicate corresponding parts in the several figures.

Figure 1:
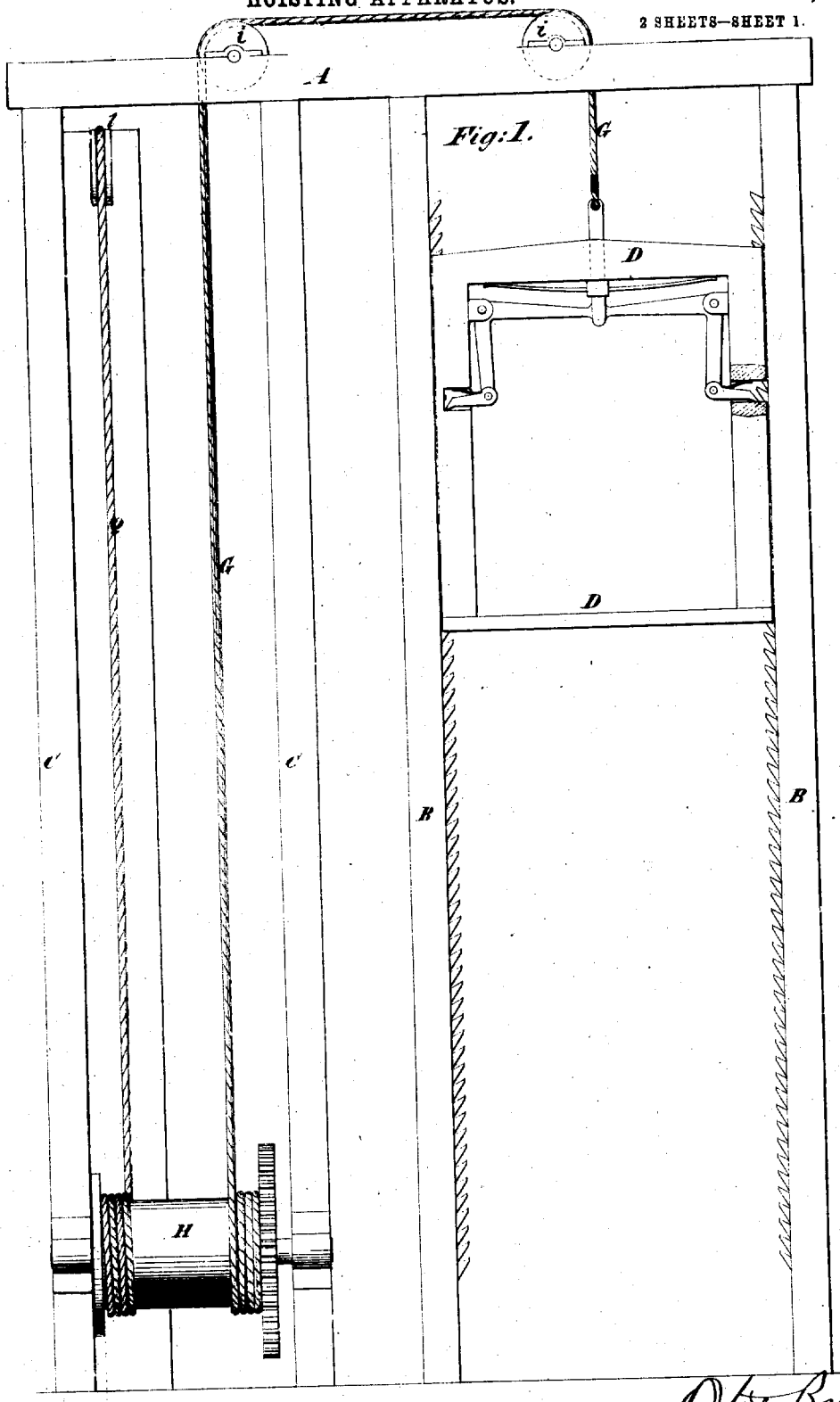
Figure 1 is a front elevation of those parts of a hoisting apparatus which are necessary to illustrate this improvement.
Figure 2:
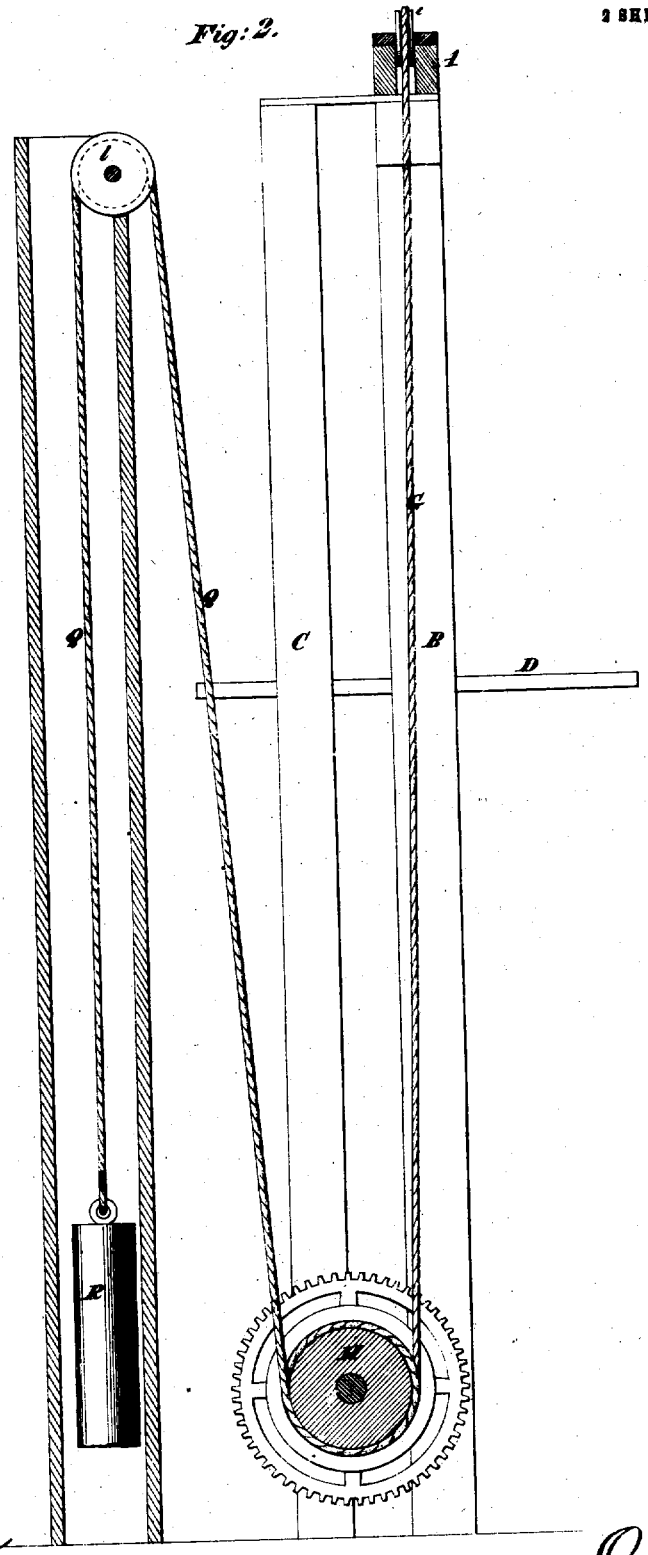
Figure 2 is a vertical section of the same at right angles to fig. 1.

This improvement consists in the combination of a counterpoise with the hoisting-platform or cab through the intervention of the hoisting-drum, whereby a counterpoise of as great a weight as or of greater weight than the platform or cab is permitted to be used.

To enable others skilled in the art to fully understand and apply the improvement, we will proceed to explain it by the aid of the drawing.

A B C is the frame-work of a hoisting apparatus.

D is the platform or cab on or in which the load is raised or lowered, working between the uprights B of the frame, where it is suspended from the hoisting-rope G, which is connected with the hoisting-drum H.

This drum may be arranged in any known or suitable position; but it is represented near the bottom of the apparatus, with its hoisting-rope G passing over pulleys *i i*.

R is the counterpoise, consisting of a weight suspended from a rope, Q, which runs over a suitably-arranged pulley, *l*.

The counterpoise-rope Q and hoisting-rope G are connected with the hoisting-drum to wind thereon in opposite directions, so that the said drum shall wind up the counterpoise-rope and raise the counterpoise as the hoisting-rope is unwound from the said drum to lower the platform or cab, and that when the drum turns in a direction to wind up the hoisting-rope and raise the platform or cab, the counterpoise-rope will be unwound and the counterpoise will descend.

The connection of the counterpoise with the platform or cab, through the intervention of the safety-drum, enables it to act upon the platform as effectively, in all respects, as though connected directly with it, while it affords the advantage of enabling a counterpoise of greater weight than the platform to be used, so that not only can the platform or cab, but the load upon it, or a portion of such load, be counterbalanced, the excess of weight of the counterpoise, when the platform or cab has no load upon it, being prevented from drawing up the platform by the brake or stop mechanism used in connection with the hoisting-drum.

The use of even as heavy a counterpoise in direct connection with the platform or cab is impracticable for the reason that it would prevent the lowering of the platform.

What is here claimed, and desired to be secured by Letters Patent, is—

The counterpoise combined with the platform or cab of the hoisting apparatus through the intervention of the hoisting-drum, substantially as herein set forth.

CHAS. R. OTIS,
*President.*
JOHN L. HUBBARD,
*Secretary.*

Witnesses:
FRED. HAYNES,
R. E. RABEAU.